United States Patent [19]

Amadieu et al.

[11] Patent Number: 4,726,012
[45] Date of Patent: Feb. 16, 1988

[54] OPTICAL MULTIPLEXER-DEMULTIPLEXER AND METHOD OF MANUFACTURING SAME

[76] Inventors: Jean-Louis P. Amadieu; Claude M. Guinet; Jacques J. C. Lonnoy, all of 41, rue Cantagrel, 75631 Paris Cedex 13, France

[21] Appl. No.: 850,106
[22] Filed: Apr. 10, 1986

[30] Foreign Application Priority Data

Apr. 12, 1985 [FR] France ............... 85 05507

[51] Int. Cl.$^4$ ............... H04B 9/00
[52] U.S. Cl. ............... 370/3; 350/96.15
[58] Field of Search ............... 370/1, 3; 350/96.16, 350/96.15, 96.2

[56] References Cited

U.S. PATENT DOCUMENTS

| | | | |
|---|---|---|---|
| 4,102,559 | 7/1978 | Hunzinger | 350/96.18 |
| 4,204,866 | 5/1980 | Horak et al. | 250/227 |
| 4,290,667 | 9/1981 | Chonn | 350/96.15 |
| 4,296,995 | 10/1981 | Bickel | 350/96.15 |
| 4,339,290 | 7/1982 | Winzer et al. | 350/96.16 |
| 4,432,601 | 2/1984 | Mannschke | 350/96.2 |
| 4,551,829 | 11/1985 | Dragoo et al. | 350/96.16 |
| 4,589,724 | 5/1986 | Winzer | 350/96.15 |

FOREIGN PATENT DOCUMENTS

| | | | |
|---|---|---|---|
| 55-95904 | 7/1980 | Japan | 350/96.16 |
| 56-5506 | 1/1981 | Japan | 350/96.15 |

Primary Examiner—Robert L. Griffin
Assistant Examiner—Leslie Van Beek
Attorney, Agent, or Firm—Laubscher & Laubscher

[57] ABSTRACT

An optical multiplexer-demultiplexer comprises a one-piece support having three grooves arranged according to a T pattern to accommodate the stretched ends of three optical fibers to be coupled. A slit is arranged at an angle of substantially 45° to the grooves and at the apex of the T pattern and contains a dichroic plate. The plate is made of a substrate carrying dichroic layers. The fibers are held in the groove by an index matching adhesive. The various members of the multiplexer-demultiplexer are assembled at the work site.

18 Claims, 4 Drawing Figures

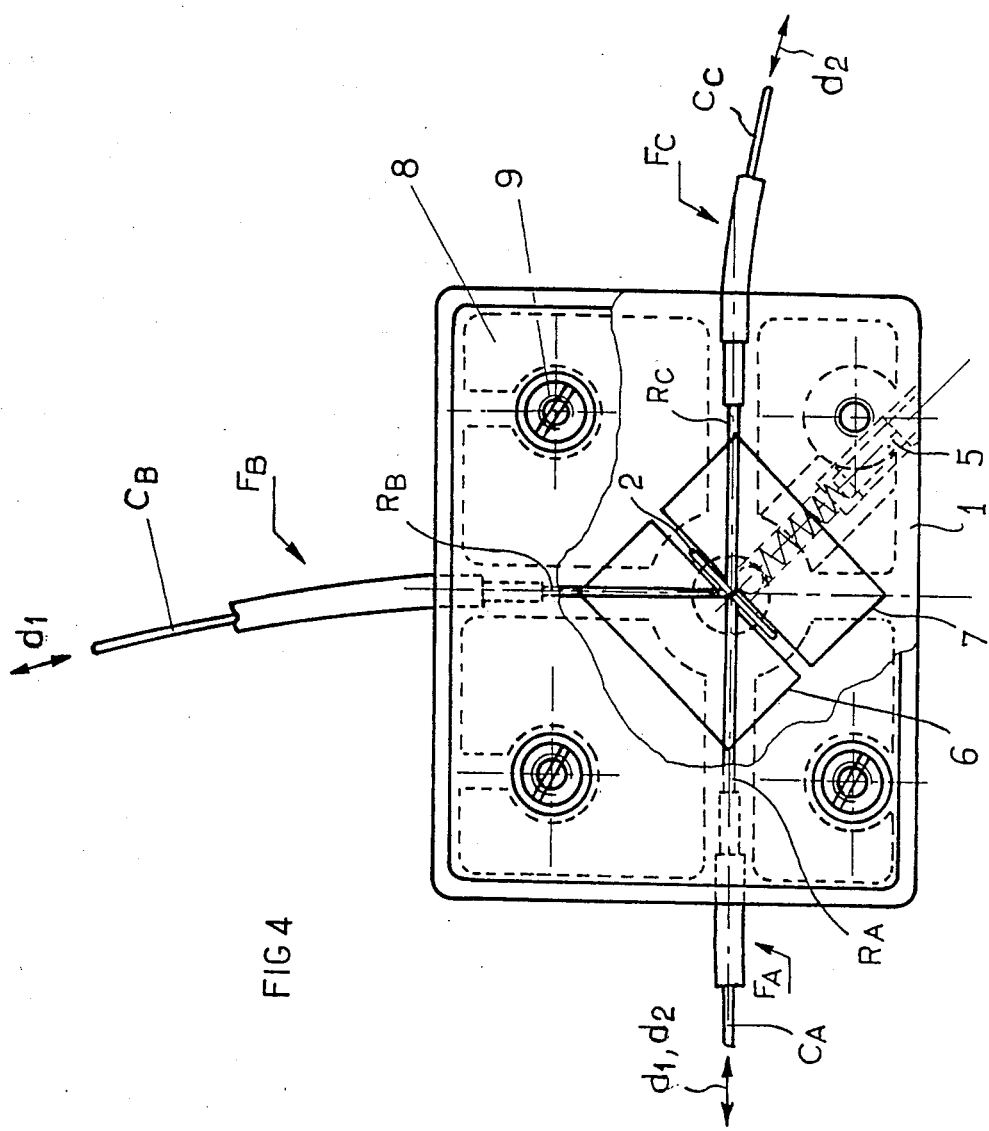

OPTICAL MULTIPLEXER-DEMULTIPLEXER AND METHOD OF MANUFACTURING SAME

BACKGROUND OF THE INVENTION

1. Field of the Invention

This invention relates to an optical multiplexer-demultiplexer device, also called a "muldex", enabling a mixing or separation of two optical signals carried by optical fibers, in other words a multiplexing or demultiplexing of two wavelengths.

When the device operates as a multiplexer, it combines in one optical fiber at least two optical signals having different wavelengths, propagated in two optical fibers. A multiplexer thus has two inputs and one output. Conversely, when the device operates as a demultiplexer, it separates two optical signals propagated in a same, single optical fiber and having two different wavelengths, each of the signals being fed to one of two output fibers. A demultiplexer thus has one input and two outputs.

Optical multiplexer-demultiplexer devices are used in particular for video or other telecommunications purposes in optical fiber cable distribution networks in which specific signal wavelengths are assigned to subscribers or groups of subscribers.

2. Description of the Prior Art

Specifically, the invention pertains to an optical multiplexer-demultiplexer device comprising ends of first, second and third optical fibers forming one of arms, a stem and another arm of a T pattern, respectively, and a dichroic filter disposed across the top of the T pattern. such a device called a "fiber optic coupler" is described in U.K. patent application No. 2,069,173.

The steps in the fabrication of such a coupler are as follows. An intermediate section of a single optical fiber intended to serve as the first and the third optical fibers is mechanically and chemically stripped; the stripped length of fiber is potted in an epoxy resin included in a mold. The potted fiber is cut in half at an angle of 45° to its axis in the stripped section. After suitable polishing, grinding and cleaning, the endface of at least one of the first and third fibers thus cut at 45° is coated with several dichroic layers and a dielectric material to form the dichroic filter.

Thereafter the two cut faces of the two molded supporting parts are assembled so as to align the first and third optical fibers by means of a conventional three-axis micrometer positioner and optical power measuring device. The fiber endfaces are bonded together with heat-setting epoxy resin, which is then heat cured. Lastly, the support so obtained is drilled in a direction perpendicular to the ends of the first and third optical fibers in order to coat with epoxy in the drilled hole a stripped and suitably prepared end of the second optical fiber.

Such a device is realizable in a factory but is difficult to fabricate at a works site due to the complex, fragile and bulky means employed. The cutting and polishing operations in particular are very difficult and the assembling of the two molded supporting parts requires considerable skill.

Moreover, when such a device is destined to couple three optical fiber ends forming part of a calbe or cables, it is necessary to connect the three ports of the device to the ends of the cable optical fibers by means of fiber-to-fiber connectors, so increasing the cost of the coupling and duration of the coupling operations. Indeed, in the prior art device, the ends of the first and third optical fibers to be coupled to establish a transmission path are derived from a single cut fiber.

OBJECT OF THE INVENTION

The main object of this invention is to obviate the above-mentioned disadvantages associated with the prior art coupler and in particular to provide an optical multiplexer-demultiplexer that does not require any cutting or polishing of the ends of the optical fibers.

Another object of this invention is to provide a means for coupling optical fibers enabling accurate positioning and direct coupling of the ends of the fibers to be joined, without recourse to an assembling of two parts of a fiber support.

Still another object of the invention is to provide a simple method of fabricating an optical multiplexer-demultiplexer in the words site.

SUMMARY OF THE INVENTION

Accordingly, the invention provides an optical multiplexer-demultiplexer comprising a one-piece support having a major face containing three grooves arranged according to a T pattern. Ends of first, second and third optical fibers are coplanarly lodged in the grooves forming one of the arms, the stem and the other arm of the T pattern respectively. A dichroic filter is disposed across the top of the T pattern to reflect an optical signal with a first wavelength propagated in the first and second optical fibers, and to transmit an optical signal with a second wavelength propagated in the first and third optical fibers. The support has a slit perpendicular to the major face and arranged at an angle of substantially 45° with respect to the three grooves to accomodate the dichroic filter at the intersection of the three grooves.

The dichroic filter is a dichroic plate including a substrate having parallel faces. One of the substrate faces faces the endfaces of the first and second optical fibers and carries dichroic layers to reflect and transmit respectively the signals with the first and second wavelengths.

Dichroic filters are made at a factory in the form of dichroic optical plates, which makes it possible to choose at the work site a filter having reflectivity and transmissivity adapted to wavelengths of optical signals transmitted by the optical fibers to be coupled.

The various component members of the device and in particular the grooved support are also factory-made. The support is provided with three, preferably V-shaped grooves to accept the stripped ends of the optical fibers in the works site, without having to call upon any type of means for positioning one fiber relative to the others. The ends of the fibers are fixed in the support simple with an adhesive and urged into the bottoms of the grooves, if need be, by glass laminae partly covering the grooved major face of the support to each side of the slit. Moreover, the dichroic plate is removable from the support and is held stationary in the slit by mechanical means, so that it can be removed and replaced with another plate adapted to other wavelengths, when the wavelengths of the optical signals propagated in the optical fibers are changed for operating purposes.

According to other features of the invention, the dichroic optical plate is composed of a substrate having a high refractive index, higher than that of the adhesive. The substrate refractive index is substantially equal to that of the inner core of the optical fibers and is typically greater than or equal to 2. The high-refractive-index substrate material imparts a reduction of the optical scattering of the optical signals and especially a reduction of the insertion loss in the transmission path formed essentially by the third optical fiber. The substrate is preferably made of silicon or of indiumphosphid.

BRIEF DESCRIPTION OF THE DRAWING

Other features and advantages of the invention will become more readily apparent in reading the description hereinafter of several preferred embodiments of the invention with reference to the accompanying drawings, in which:

FIG. 4 is a top view of the multiplexer-demultiplexer, with a cut-away part of a cover, to illustrate the positioning of two glass laminae covering the ends of fiber cores on a grooved major face of the multiplexer-demultiplexer support.

DESCRIPTION OF THE PREFERRED EMBODIMENTS

Figure 1:
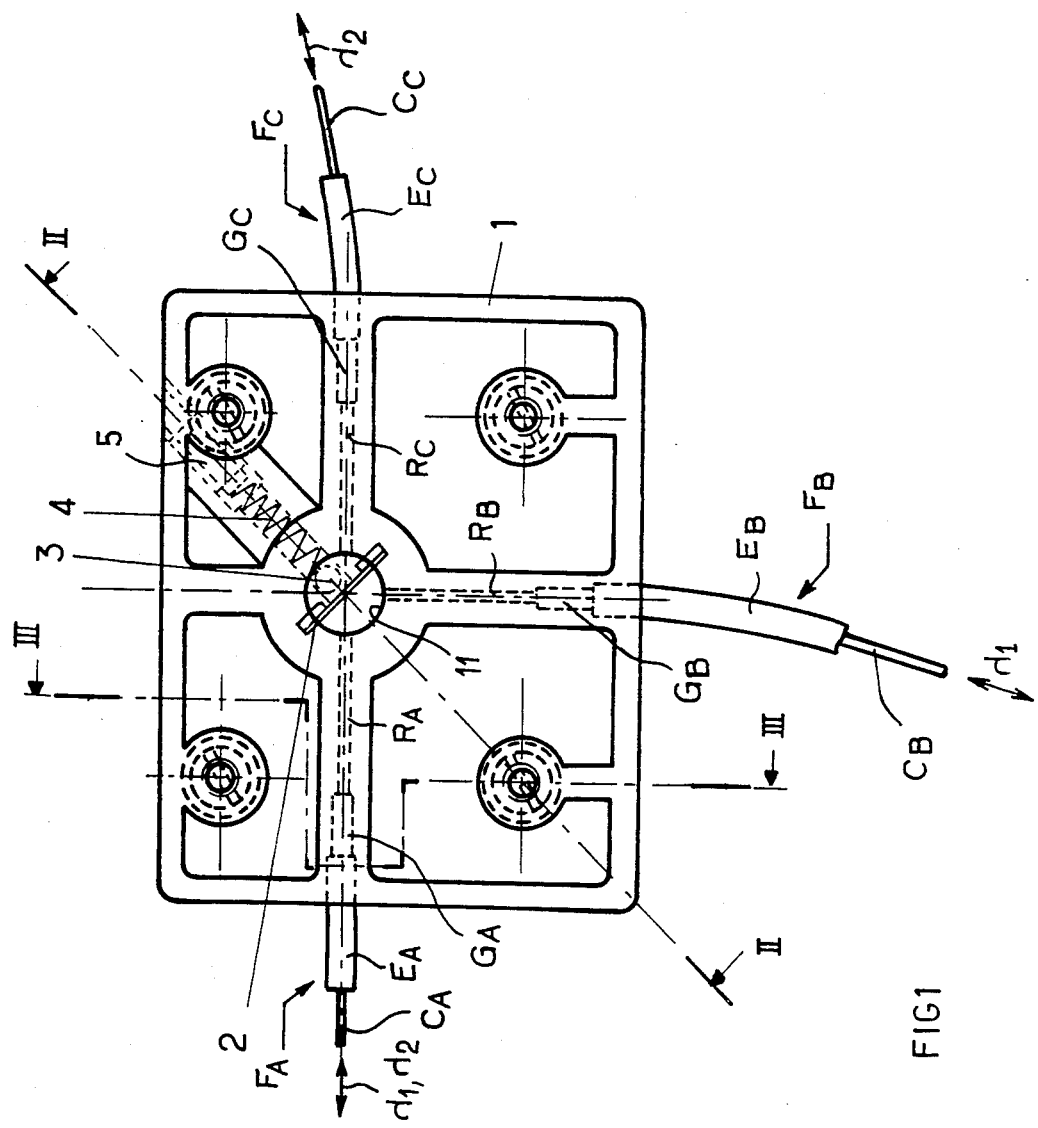
FIG. 1 is a bottom view of an optical multiplexer-demultiplexer embodying the invention.

Referring to FIG. 1, an optical multiplexer-demultiplexer embodying the invention comprises a rectangular, thin, one-piece support 1. The support is preferably made of a thermoplastic or thermosetting material, or of a ceramic, or an aluminum-base light alloy which is molded and/or machined to shape.

Three straight grooves $R_A$, $T_B$, $R_C$ are provided in a top major face 10 of the support 1 and are arranged perpendicularly to three respective sides of the support. The three grooves are of equal length and have identical cross-sections, namely for example, V-shaped cross-sections with a peak angle of approximately 60°. The grooves are coplanar and are arranged relative to one another to form substantially a "T" pattern on the top face 10. The first and third grooves $R_A$ and $R_C$ are two arms of the T, and the second groove $R_B$ is a stem of the T. The apex of the T pattern is located at the center of a recess or bore 11 formed in a bottom major face of the support. Thus, the first groove $R_A$ and the third groove $R_C$ are each perpendicular to the second groove $R_B$. The groove $R_C$ is parallel to groove $R_A$, but is offset from the latter to the opposite side of groove $R_B$ by a very short distance d which is given precisely hereinafter.

Figure 2:
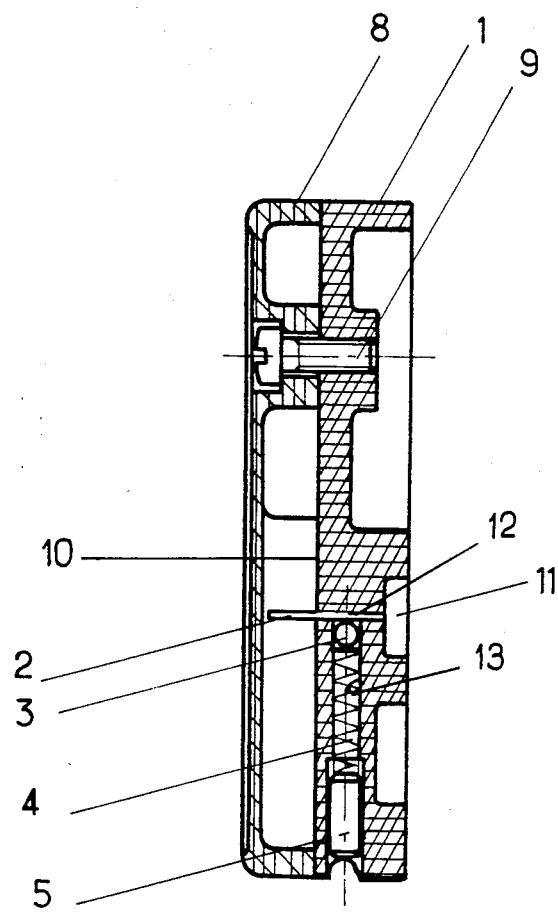
FIG. 2 is a cross-section taken along line II—II of FIG. 1 showing particularly means for immbolizing a dichroic plate in a fiber support of the multiplexer-demultiplexer.

As shown in FIGS. 1 and 2, a narrow slit 12 is extends axially of recess 11, perpendicular to the top major face 10 of the support and outside the right-angle sector formed by the grooves $R_A$ and $R_B$. The slit is angled 45° with respect to the grooves. In slit 12 is slidably lodged a removable dichroic plate 2 which accordingly is disposed 45° to the grooves and exactly centered at the intersection of the two grooves $R_A$ and $R_B$. The slit is longer than the diameter of recess 10 and presents, at a suitable depth, a bottom supporting a longitudinal edge of the removable plate 2 to align the center of the plate with the grooves. Plate 2 is locked in slit 12 by means of a ball 3 biased by a helical spring 4 against one face of the plate. As best seen in FIG. 2, ball 3 and spring 4 are housed in a cylindrical passage 13 arranged substantially perpendicularly to and at the center of slit 12 in support 1. A screw 5 screwed into the cylindrical passage 13 serves to adjust the pressure exerted by the spring 4 on the plate 2 through the ball 3, and thus to immobilize the plate 2 in slit 12. By backing out the screw 5, it is possible to remove the plate 2 in view of replacing it with another dichroic plate when, for example, wavelengths of the optical signals propagated by the optical fibers to be coupled are modified.

The grooves $R_A$, $R_B$ and $R_C$ are intended to receive ends of optical fibers $F_A$, $F_B$ and $F_C$ respectively. Each optical fiber $F_A$, $F_B$ and $F_C$ is composed in a known way of a core $C_A$, $C_B$, $C_C$ concentrically covered with a coating or cladding $G_A$, $G_B$, $G_C$ and an external protective jacket $E_A$, $E_B$, $E_C$, generally of elastomer, concentrically surrounding the cladding. Each of the grooves $R_A$, $R_B$, $R_C$ has stepped cross section diminishing in area towards the slit 12 and comprises, moving inward from the respective outside side of the support 1, a first portion having a large cross section receiving an end of the protective jacket $E_A$, $E_B$, $E_C$ of the respective optical fiber $F_A$, $F_B$, $F_C$, a second portion of intermediate cross section receiving an end of the cladding, $G_A$, $G_B$, $G_C$ on the respective optical fiber, and a third portion of small cross section receiving an end of the core $C_A$, $C_B$, $C_C$ of the respective unclad fiber and terminating at the slit 12.

After known cladding and jacket removal steps and prior to lodging the stripped fiber in the corresponding groove $R_A$, $R_B$, $R_C$, the end of the core of the fiber $F_A$, $F_B$, $F_C$ is cut by cleaving, which is to say cut exactly perpendicularly to the axis of the fiber such as to obtain a perfectly even, defect-free endface. The cleavage can be obtained by means of a cutting plier like that described in French patent application No. 2,561,223.

The dichroic plate 2 is substantially a parallel-face plate, not however made of glass as are prior art dichroic filters, but rather of a substrate having a high refractive index. This makes it possible to reduce the divergence of the light beams received by the plate as will appear later herein. For example, the plate 2 includes a substrate of silicon (Si) approximately 100 $\mu$m thick, or a substrate of indiumphosphid (InP). On a back face of the plate 2, facing the end of fiber $F_C$, is deposited an antireflective layer. On a front face of the substrate intended to face the ends of grooves $R_A$ and $R_B$ are deposited, as with prior art dichroic filters, by evaporation for example, metallized layers enabling reflection of waves $\lambda_1$ in a predetermined spectral band and transmission of waves $\lambda_2$ in another predetermined spectral band. The usual evaporation deposition materials used are selected from among $SiO_2$, $TiO_2$, ZnS, Cryolite, ZnSe and $ThF_4$. It deserves to be noted that the prior art dichroic filters require a large number of coatings and often more than 50 and that these layers make it difficult to optimize transmissions of 1.2 to 1.4 $\mu$m wavelengths as well as to fabricate the filter in an industrial environment.

The substrate of high-refractive-index material absorbs energy at a wavelength $\lambda_1$ which is to be reflected and is propagated from fiber $F_A$ to fiber $F_B$, or from fiber $F_B$ to fiber $F_A$, and transmits energy at a wavelength $\lambda_2$, to be transmitted from fiber $F_C$ to fiber $F_A$, or from fiber $F_A$ to fiber $F_C$. For example, the substrate is absorbant of wavelengths ranging from 0.8 to 0.9 $\mu$m and transparent to wavelengths ranging from 1.2 to 1.4

μm. Thus, with silicon having a thickness of 100 μm and an absorption of more than 13 dB for the wavelength $\lambda_1$, the reflection coefficient required of the filter is only 0.98, instead of 0.999 according to the prior art, which makes the filter easily realizable with a considerably reduced number of dichroic layers, less than 30 for example. Such a dichroic plate 2 embodying to the invention affords a rejection factor as low as 17 dB, compared with 30 dB for the dichroic filters according to the prior art.

Figure 3:
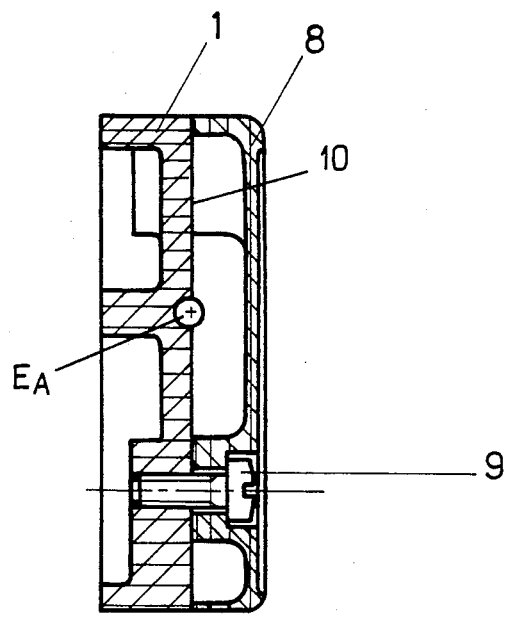
FIG. 3 is a cross-section taken along the broken line III—III of FIG. 1, showing the transverse positioning of an optical fiber in the multiplexer-demultiplexer.

The stripped optical fibers $F_A$, $F_B$ and $F_C$ are accommodated in the bottoms of the respective grooves $G_A$, $G_B$ and $G_C$ and have endfaces butting against the plate 2. An index matching fluid having a suitable refractive index is deposited in the bottom of each groove and on the dichroic plate 2. The ends of the cores $C_A$, $C_B$ and $C_C$ of fibers $F_A$, $F_B$ and $F_C$ are pushed in and held in place in the third portions of the respective grooves $R_A$, $R_B$ and $R_C$ by means of two glass laminae 6 and 7 covering part of the top major face 10 of the support 1. As shown in FIG. 4, one, 6, of the laminae presses on the cores of fibers $F_A$ and $F_B$ located in front of the front face of the dichroic plate 2, and the other lamina 7 presses on the core of fiber $F_C$ located in front of the back face of the plate 2. As shown in FIGS. 2, 3 and 4, a cover 8 is then applied to the top face 10 of the support 1. Cover 8 is attached to the support 1 by means of four screws 9 distributed in four corners of the support 1 to close and seal the multiplexer-demultiplexer device. The support 1 and cover 8 are machined or, preferably, molded to reduce their manufacturing cost.

The support 1 and cover 8 have hollowed out or recessed portions as seen in FIGS. 2 and 3, obtained preferably by molding to economize the amount of material utilized for the support and the cover. Moreover, the cover 8 rests on the face 10 of the support 1 and is recessed above the laminae 6 and 7.

As previously stated, the ends of the fibers are immersed in a fluid, in specifically a polymerizable adhesive deposited mainly in the bottom of the third portions of grooves $R_A$, $R_B$ and $R_C$, containing the fiber core ends $C_A$, $C_B$ and $C_C$, and partly on the dichroic plate 2. This glue has a refractive index n preferably substantially equal to that of the fibers cores. After polymerization by ultraviolet radiation, the adhesive fixes the fibers $F_A$, $F_B$ and $F_C$ in the grooves and the glass laminae 6 and 7 on the support 1.

In addition, when the refractive index n of the adhesive is equal to that of the fibers, no Fresnel loss occurs at dioptres formed by the endfaces of the cut fiber cores, and divergences of the light beams conveyed by the fibers is reduced. Choosing a suitable substrate having an index of refraction $n_s$ and a thickness e to make the diochroic plate 2 reduces the optical separation between the fiber $F_A$ carrying two wavelengths $\lambda_1$ and $\lambda_2$ and the fiber $F_C$ carrying the wavelengths $\lambda_2$. The plate 2 behaves as though the thickness e of the substrate were equal to $e.n/n_s$. Since the substrate index $n_s$ is greater than n and in fact is preferably greater than or equal to 2, the optical separation is reduced and the insertion loss in the transmission path formed by the fibers $F_A$ and $F_C$ is improved.

When the fibers $F_B$ and $F_C$ propagate wavelengths $\lambda_1 = 0.8$ μm and $\lambda_2 = 1.3$ μm, a 100 μm-thick silicon substrate guarantees 30 dB of crosstalk in the transmission path $F_A$ or $F_C$, thanks to the high absorptive power of the plate 2 substrate with respect to the wavelength $\lambda_1$. The 30 dB value cannot be obtained with the prior art using only a single dichroic filter, immersed in glue at an incidence of 45°.

Likewise, in the reflection path $F_A$ or $F_B$, crostalk is less than 30 dB owing to the high transmissivity of the substrate of plate 2 with respect to the wavelength $\lambda_1$. The coupling performance, i.e. the reflection throughput loss at the $\lambda_1$ wavelength and the transmission throughput loss at the $\lambda_2$ wavelength, is summarized in the following table.

| Fiber size Core diameter/cladding diameter | $\lambda_1 = 0.85$ μm | $\lambda_2 = 1.3$ μm |
| --- | --- | --- |
| 50/125 μm | 1.2 dB | 1.7 dB |
| 85/125 μm | 0.7 dB | 1.2 dB |

The multiplexer-demultiplexer embodying the invention affords numerous advantages and simplifications over the prior art. It does not require, as does the prior art technique, any polishing of the fiber enfaces; a simple cleaving cut is enough. Optical continuity is ensured on the one hand by the adhesive and on the other hand by the substrate. The adhesive eliminates contamination effects, such as from dust, and provides good optical confinement.

In effect, the multiplexer-demultiplexer is a confined light optical system; to carry out a multiplexing of two optical signals transmitted by the fibers $F_B$ and $F_C$ into a multiplex optical signal in the fiber $F_A$, or a demultiplexing of a dual-wavelength optical multiplex signal transmitted by fiber $F_A$ into two optical signals in fibers $F_B$ and $F_C$, the multiplexer-demultiplexer operates without any transformation of the beams leaving the ends of the fibers; no beam collimation by means of optical elements such as lenses, and particularly Sefloc lenses, is necessary. The adhesive utilized as an interface medium between the endfaces of the fibers $F_A$, $F_B$ and $F_C$ and the dichroic plate 2 and as a means for immobilizing the fibers in grooves $R_A$, $R_B$ and $R_C$ is a known glue which polymerizes under the influence of ultraviolet radiation. Any of the glues or locking compounds comercially available under the trade marks EPOTEK, LOCTITE and VITRALIT can be used.

Moreover, the multiplexer-demultiplexer formed by the support 1 and cover 8 is a compact assembly which protects the optical coupling against environmental impingements such as blows, vibrations and the like. The members making up the multiplexer-demultiplexer can be mass produced at low cost.

The only special precaution to be taken in making the support 1 is to anticipate the aforementioned offset d of the groove $R_C$ in dependencd upon the transmitted wavelength $\lambda_2$ so as to suitably mold or machine the groove $R_C$ for the purpose. A person having ordinary skill in the art can easily calculate the offset d according to the characteristics of the dichroic plate 2 and, in particular, based on the thickness e of the plate and the index $n_s$ of the substrate, using classical refraction equations. For example, if r denotes an angle of refraction for an angle of incidence i of 45° in the embodiment illustrated, the offset is deduced from the following equation:

$$d = e(\sin(i-r))/\cos r = f(n_s, n, e, i)$$

In addition, the multiplexer-demultiplexer can be utilized for two-way transmissions, each of the wavelengths $\lambda_1$ and $\lambda_2$ being transmitted in one or the other direction and independently of the other.

What we claim is :

1. An optical multiplexer-demultiplexer, comprising:
   (a) a support (1) having a major face (10) containing three grooves ($R_A$, $R_B$, $R_C$) arranged to define a T-shaped pattern, said support also containing at the apex of said pattern a slit (12) that extends normal to said major face at an angle of 45° relative to said second groove and one of said first and third grooves;
   (b) three optical fibers having end portions arranged in and generally coplanar with said grooves, respectively, first ($F_A$) and third ($F_C$) optical fibers being mounted in the arm portions of the T-shaped pattern, and the second ($F_B$) optical fiber being mounted in the stem portion of the pattern; and
   (c) dichroic filter means (2) mounted in said slit between the adjacent ends of said first and third optical fibers for reflecting a first optical signal having a first wavelength ($\lambda_1$) propagated in said first and second optical fibers, and for transmitting a second optical signal having a second wavelength ($\lambda_2$) propagated in said first and third optical fibers, said dichroic filter means including a dichroic plate substrate having substantially parallel faces, the face of said plate facing the adjacent ends of said first and second optical fibers carrying layers of dichroic materials that reflect and transmit signals having said first and second wavelengths, respectively.

2. The optical multiplexer-demultiplexer claimed in claim 1, wherein said dichroic plate substrate has a refractive index of at least 2.

3. The optical multiplexer-demultiplexer claimed in claim 1, wherein said dichroic plate substrate is made of silicon.

4. The optical multiplexer-demultiplexer claimed in claim 1, wherein said dichroic plate substrate is made of indiumphosphid.

5. An optical multiplexer-demultiplexer as claimed in claim 1, comprising an adhesive for holding said optical fibers in said grooves, said adhesive being interposed between said fiber endfaces and said dichroic plate.

6. The optical multiplexer-demultiplexer claimed in claim 5, wherein said optical fibers each include a core portion and a cover portion, and further wherein said adhesive has a refractive index substantially equal to that of said optical fibers cores.

7. The optical multiplexer-demultiplexer claimed in claim 6, wherein said adhesive refractive index is lower than that of said plate substrate.

8. The optical multiplexer-demultiplexer claimed in claim 1, wherein said grooves in said support are V-grooves.

9. The optical multiplexer-demultiplexer claimed in claim 1, wherein said groove containing said third fiber end is offset parallel to the groove containing said first fiber end in the direction away from the groove containing said second fiber end a distance depending on the thickness and refraction index of said dichroic plate substrate.

10. The optical multiplexer-demultiplexer claimed in claim 1, wherein said support is unitary and is made at least partly by molding and at least partly by machining.

11. The optical multiplexer-demultiplexer claimed in claim 1, wherein said support is made of a meterial selected from among a thermoplastic material, a thermosetting material, a ceramic ,or an aluminum-base alloy.

12. Apparatus as defined in claim 1, and further including means for immobilizing said optical fiber ends and for pressing the same in said grooves, respectively, on both sides of said dichroic plate, said immobilizing and pressing means include a plurality of glass laminae adhesively secured to the support major face across said grooves, respectively.

13. An optical multiplexer-demultiplexer, comprising:
   (a) a support (1) having a major face (10) containing three grooves ($R_A$, $R_B$, $R_C$) arranged to define a T-shaped pattern, said support also containing at the apex of said pattern a slit (12) that extends normal to said major face at an angle of 45° relative to said second groove and one of said first and third grooves;
   (b) three optical fibers having end portions arranged in and generally coplanar with said grooves, respectively, first ($F_A$) and third ($F_C$) optical fibers being mounted in the arm portions of the T-shaped pattern, and the second ($F_B$) optical fiber being mounted in the stem portion of the pattern; and
   (c) dichroic filter means (2) removably mounted in said slit between the adjacent ends of said first and third optical fibers for reflecting a first optical signal having a first wavelength ($\lambda_1$) propagated in said first and second optical fibers, and for transmitting a second optical signal having a second wavelength ($\lambda_2$) propagated in said first and third optical fibers, said dichroic filter means including a dichroic plate substrate having substantially parallel faces, the face of said plate facing the adjacent ends of said first and second optical fibers carrying layers of dichroic materials that reflect and transmit signals having said first and second wavelengths, respectively.

14. An optical multiplexer-demultiplexer, comprising:
   (a) a support (1) having a major face (10) containing three grooves ($R_A$, $R_B$, $R_C$) arranged to define a T-shaped pattern, said support also containing at the apex of said pattern a slit (12) that extends normal to said major face at an angle of 45° relative to said second groove and one of said first and third grooves;
   (b) three optical fibers having end portions arranged in and generally coplanar with said grooves, respectively, first ($F_A$) and third ($F_C$) optical fibers being mounted in the arm portions of the T-shaped pattern, and the second ($F_B$) optical fiber being mounted in the stem portion of the pattern;
   (c) dichroic filter means (2) mounted in said slit between the adjacent ends of said first and third optical fibers for reflecting a first optical signal having a first wavelength ($\lambda_1$) propagated in said first and second optical fibers, and for transmitting a second optical signal having a second wavelength ($\lambda_2$) propagated in said first and third optical fibers, said dichroic filter means including a dichroic plate substrate having substantially parallel faces, the face of said plate facing the adjacent ends of said first and second optical fibers carrying layers of dichroic materials that reflect and transmit signals having said first and second wavelengths, respectively; and (d) means for immobilizing said dichroic plate in said support slit.

15. The optical multiplexer-demultiplexer claimed in claim 14, wherein said dichroic plate immobilizing means are housed in a passage in said support and include a spring interposed between a ball and a screw for biasing said dichroic plate laterally in said slit.

16. Method of fabricating an optical multiplexer-demultiplexer whereby ends of three optical fibers are stripped in the vicinity of a slit in a support having grooved major face, a dichroic plate is accomodated in said slit, said fiber ends are cut and are lodged near said dichoric plate in the respective grooves forming a T pattern in said support major face and are immersed in an index mathcing fluid, and said fiber ends are immobilized in said grooves of the support by pressing means disposed on said major face of said support to each side of the said dichroic plate, said pressing means being themselves fixed against said major face of said support.

17. The method claimed in claim 16 where said end of each fiber is cut by cleaving perpendicularly to the longitudinal axis of the fiber.

18. The method claimed in claim 16 wherein said index matching fluid is an adhesive.

* * * * *